United States Patent
Morales Barbosa

(10) Patent No.: US 8,346,240 B2
(45) Date of Patent: Jan. 1, 2013

(54) METHOD AND SYSTEM FOR COMPLETING A ZONE RELATED CALL

(75) Inventor: Camilo Ernesto Morales Barbosa, Maastricht (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 265 days.

(21) Appl. No.: 12/678,247

(22) PCT Filed: Sep. 20, 2007

(86) PCT No.: PCT/EP2007/059999
§ 371 (c)(1),
(2), (4) Date: Apr. 15, 2010

(87) PCT Pub. No.: WO2009/036805
PCT Pub. Date: Mar. 26, 2009

(65) Prior Publication Data
US 2010/0210259 A1    Aug. 19, 2010

(51) Int. Cl.
*H04W 40/00*    (2009.01)

(52) U.S. Cl. ............... 455/422.1; 455/456.1; 455/456.2; 455/456.3; 455/560; 455/405

(58) Field of Classification Search .... 455/456.1–456.5, 455/422.1, 405, 560
See application file for complete search history.

(56) References Cited

U.S. PATENT DOCUMENTS

| 6,192,115 B1 | 2/2001 | Toy et al. |
| 2004/0166878 A1* | 8/2004 | Erskine et al. ............ 455/456.1 |
| 2006/0025158 A1* | 2/2006 | Leblanc et al. ............ 455/456.2 |

FOREIGN PATENT DOCUMENTS

WO    WO 02/23935 A2    3/2002

* cited by examiner

*Primary Examiner* — Kiet Doan
*Assistant Examiner* — Michael T Vu

(57) ABSTRACT

A method and system, for completing a call to a mobile subscriber having one or more zones defined, where the calling party is presented options for call completion based on the distance and direction of the called mobile subscriber in relation to his zones and presence inside a perimeter around his zone. The call completion comprising; call back, notification by SMS or notification by voice message on entry or exit of the area enclosed by the perimeter, or connect with additional charges for the calling party.

16 Claims, 4 Drawing Sheets

Figure 4a

Zone Table 200

| MSISDN | Zone NR | GCC | Presence | Movement | Time stamp |
|--------|---------|-----|----------|----------|------------|

Zone-distance Table

| MSISDN | Zone NR | Distance | Time stamp |
|--------|---------|----------|------------|

Figure 4c

Zone-cell Table

| MSISDN | Zone NR | Cell (MCC, MNC, GCI/SAI) |
|--------|---------|--------------------------|

Figure 4d

Event Table 206

| Calling Party id | MSISDN | Condition | Action code | Action data |
|------------------|--------|-----------|-------------|-------------|

207

METHOD AND SYSTEM FOR COMPLETING A ZONE RELATED CALL

FIELD OF THE INVENTION

The present invention relates generally to completion of calls in a communication system comprising; mobile and fixed terminals, a radio network infrastructure, network nodes, and a land based transport network, to mobile terminal parties having one or more zones defined comprising one or more cells of the radio network infrastructure.

More particularly, the present invention facilitates a method and system for calling party selectable call completion when the called mobile terminal is not present in its zone.

BACKGROUND OF THE INVENTION

The state of the art telecommunications systems know for some time the home or office zone concept. Here a mobile phone of which the current location is inside a predefined zone (in practise one or more cells of a HPLMN) is treated differently then when it is outside such a zone. Most commonly the charges are lower when calling inside the zone. This is comparable to local calls in a fixed network. The related call completion, when such a mobile phone is called, consists of just connecting when the called party is in its zone or connecting to the voice mail when outside the zone. More advanced is to give the calling party the freedom to select a "connect anyway" option with a higher charge rate. FIG. 1 gives an overview of the state of the art system.

An incoming call A for the mobile phone arrives at the MSC (Mobile services Switching Centre) in the HPLMN (Home Public Land mobile network) of the mobile phone. This MSC is also known by its designation as G-MSC (Gateway MSC) to make a difference to a terminating MSC (T-MSC) when the mobile phone is in another PLMN than the HPLMN. First act of the MSC is to obtain via an interface 4 to the HLR (Home location Register) the subscriber data stored in the HLR. Based on a set parameter T-CSI (terminating CAMEL subscription information) in the subscriber data or by detecting a zone related mobile number in number analysis, the MSC invokes the zone application C in the SCP (Service Control Point) by means of a CAP-IDP message (CAMEL Application Part—Initial Detection Point). The zone application checks on the location of the mobile phone. It therefore can do a MAP-ATI (Mobile Application Part—Any Time Interrogation) via an interface 3 to the HLR. This will provide amongst others the last stored position of the mobile phone. Detailed position information is however not regular updated in the HLR. The HLR stored position is time stamped so the age can be determined. Instead of MAP-ATI, the zone application can send a MAP-ALR (Mobile Application Part—Active Location Request) via the interface 3 to the HLR. Now the HLR does a position request via the interface 4 to the T-MSC. The T-MSC replies with a position report via the interface 4. In FIG. 1 the situation is given where the mobile phone resides in the HPLMN and therefore G-MSC and T-MSC are the same. The position report is stored with the time stamp in the HLR and can be accessed by a next MAP-ATI. As the zone application did an MAP-ALR, the HLR provides the position report via the interface 3 to the zone application.

The position information in the report comprises several elements;

MCC—Mobile Country Code (country the mobile is currently,

MNC—Mobile Network Code (PLMN serving the mobile),

LAC—Location Area Code (PLMN is divided into LAs),

CI—Cell Identifier (GSM cell mobile is camping),

SAI—Service Area Identifier (UMTS node-B serving the mobile),

LAT/LONG position and uncertainty in that position, Velocity of mobile.

The elements MCC, MNC and LAC are standard and always provided. CI is only given for GSM phones, SAI only for UMTS phones. The LAT/LONG position and velocity depends on settings in the MSC which can be blocked, free or only available for operator own network nodes. Details on the LAT/LONG position can be found in the 3GPP Technical Specification 23.032. Velocity is only available when velocity measurement is implemented in the MSC.

Instead of the HLR, advanced position reports can also be obtained from a MPS (Mobile Positioning System) via the MAP interface using the MLP protocol when the network is equipped with an MPS. The output is comparable to that provided by the HLR.

A Zone is defined as one or more cells (GSM) or Service areas (UMTS). By default they are all located in the HPLMN. The may reside on the border of the HPLMN or any where else inside the HPLMN. The defined zone may be located across the border of two adjacent Location Areas.

The zone application compares the actual position by means of the MCC, MNC and CGI/SAI value with the defined cells forming the zone. When the mobile is in the zone, connection to the mobile B is ordered, else connection to the voice mail $B_{VM}$ of mobile B is ordered. The order is sent to the MSC with a CAP-CON (CAMEL Application Part—Connect) via the interface 2. The MSC then establishes the connection to either mobile B or its voice mail $B_{VM}$.

Instead of just connect to the voice mail a more advanced mode is known, where the user may select anyhow connection but with additional charges. In this case first an order is given to the MSC for playing an announcement to the calling party A. The order CAP-PA (CAP-Play Announcement) consists of or a combination of; fixed message identifiers (of pre-recorded messages), text strings (that will be converted to speech) or a variable message identifiers (of pre-recorded message with variable parameters included like time, date, duration or price that are provided with the identifier and converted to speech).

This announcement may include user selectable options so that the calling party can select an option by pressing one of the keys on the phone.

After playing the announcement the MSC returns a CAP-SSR (CAP-Specialized Resource Report) that includes the CAP-PA details. In order to receive the pressed key information from the user the zone application has to send a CAP-PC (CAP-Prompt and Collect user information). The CAP-PC includes number of wanted digits, timeout value etc. The MSC replies with a CAP-PCR (CAP-PC Result) when the digits are entered or after timeout.

The zone server applications acts on the user selection with a CAP-CON to either mobile B or to its voice mail $B_{VM}$.

Full details on the CAP operations can be found in the CAP technical specification 3GPP TS 29.078

Although FIG. 1 shows an implementation based on a zone server application in a SCP it can be implemented in various other ways like a dedicated zone server node acting towards the MSC as SCP.

The area of a zone is generally rather small compared to the full area of the HPLMN. The information provided to the calling party is therefore limited to; the called party is in a VPLMN, in the HPLMN, or in one of his defined zones. The Location Area (LA), as intermediate area for presence detection is not usable as a zone may have cells in more then one Location Area when it lies across the border of two Location Areas.

The object of the invention is to provide a calling party with more detailed information on a current location of the called party and a wider choice of related call completion options.

SUMMARY OF THE INVENTION

The solution is provided with the current invention of a method for completing a call from a calling party to a mobile subscriber having one or more zones defined in a Public Land Mobile Network, and the mobile subscriber is not present in one of his defined zones. The method comprising the steps of; Determine the presence of the mobile subscriber inside a circular perimeter ($\theta$) around a zone ($\alpha$) being larger then the zone ($\alpha$) having a radius ($\epsilon$), and a zone geographical centre coordinate ($\delta$) of the zone ($\alpha$), initiate an announcement to be played to the calling party comprising a current location of the mobile subscriber in relation to a zone and options for the calling party to complete the call, analyse and execute a selection from the calling party of the options, by the zone server.

Further instances of the current invention provide additional steps for the main method; checking allowance for the calling party to receive the current location of the mobile subscriber, and determine the closest zone when the mobile subscriber has more then one defined zone, as well as an alternative to play also an announcement with options when a person is inside a zone and parental control on the allowance for receiving the current position.

A first embodiment of the invention is provided by A Zone Server having Mobile Application Part interfaces towards Home Location Registers via a Mobile Application Part interface controller and Camel Application Part interfaces towards Mobile Switching Centres via a Camel Application Part interface controller for receiving position reports of mobile subscribers having at least one defined zone and incoming call triggers for the mobile subscribers, Characterised by,

- A calculator function connected to a zone base for determining a closest zone of the at least one defined zone of a mobile subscriber and presence of the mobile subscriber outside the closest zone and inside a circular perimeter around the closest zone, based on the received position reports,
- A zone base for storing the at least one defined zone and presence of mobile subscribers, and allowance for calling parties to receive presence information,
- A decision function connected to the zone base 105 for checking if a calling party is to receive presence, assembling an announcement for the calling party including option for completing a call and analyse and execute a selected option from the calling party, based on the received incoming call triggers,
- An event manager connected to the decision function and an event base for receiving future event triggers from the decision function, analysing the future event trigger, storing a future event in the event base, scanning the event base for future events to be executed and execute these future events,
- An event base for storing future events to be executed.

The first embodiment being further characterised in that the decision function is specially adapted for receiving Intelligent Network service calls via the Camel Application Part interface from mobile subscribers, determining the allowance for calling parties based on the received Intelligent Network service calls and storing this allowance in the zone base. This feature allows the mobile subscriber to switch allowance for detailed presence information on or off for calling parties by making a service call to the zone server.

The first embodiment also being further characterised in that the decision function has an Internet Protocol connection for receiving allowance order messages from mobile subscribers, and is specially adapted to update allowance for calling parties to receive detailed presence information, based on the allowance order messages. This feature allows the mobile subscriber to use a web interface to maintain a group of calling parties that is treated differently from non-group calling parties where related to receiving detailed presence information when making a call to the mobile subscriber.

A second embodiment is provided by a software application, residing as Zone Server Application in one or more network nodes, performing all functions of a zone server. The Zone Server Application being resident in said nodes or loaded from a carrier on which said software application is stored or transported from a repository where said software application is stored. The zone server application embodiment allows for use of items like the interface controllers which might already be present in network nodes.

BRIEF DESCRIPTION OF THE DRAWINGS

FIG. 4*a*-4*d* present the table and record structures of the zone server

DETAILED DESCRIPTION

As outlined the objective is to provide a calling party with more detailed information on the location of a called party in relation to the called party zone or zones, when the called party is not in one of his zones. This information shall be dedicated to provide a base for selecting a call completion.

Figure 1:
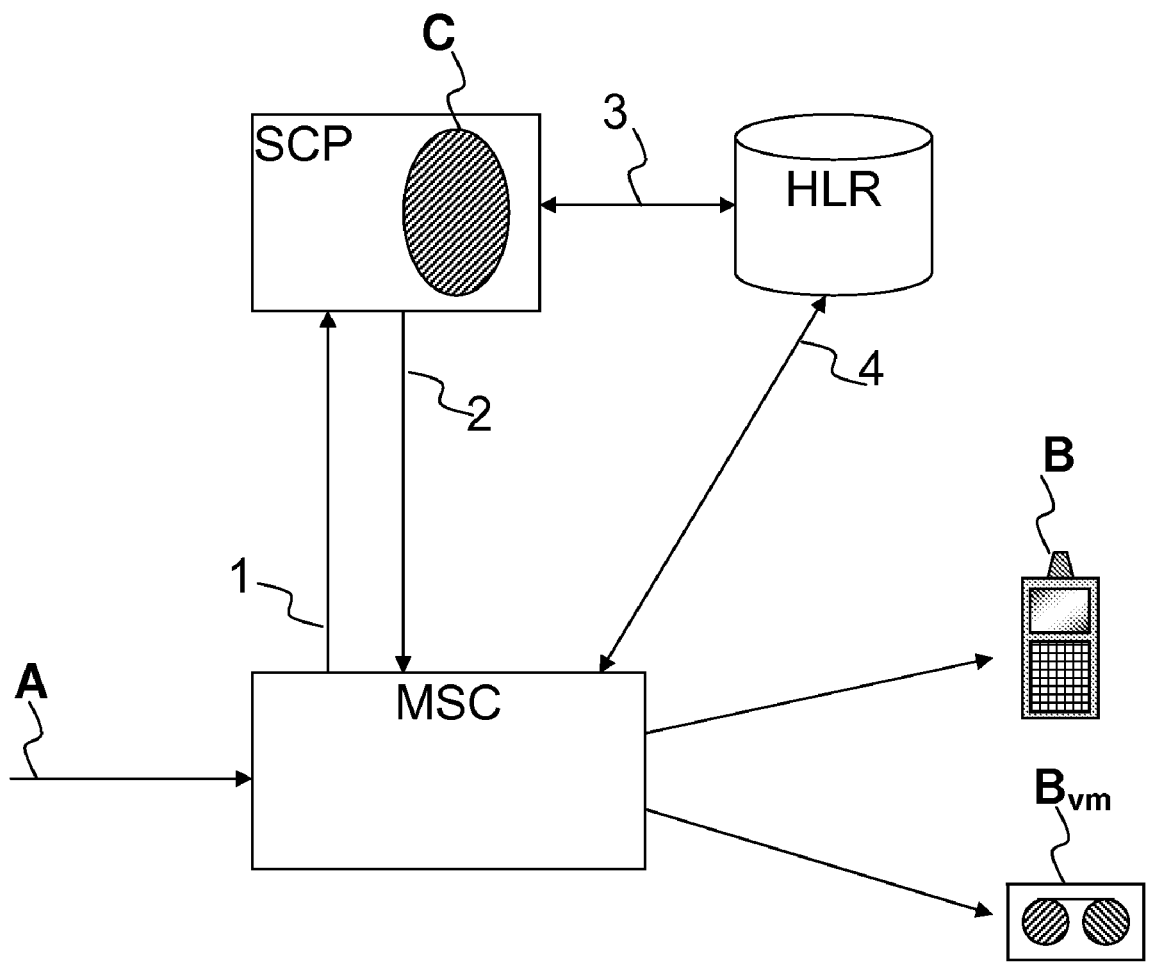
FIG. 1 presents the state of the art system
Figure 2:
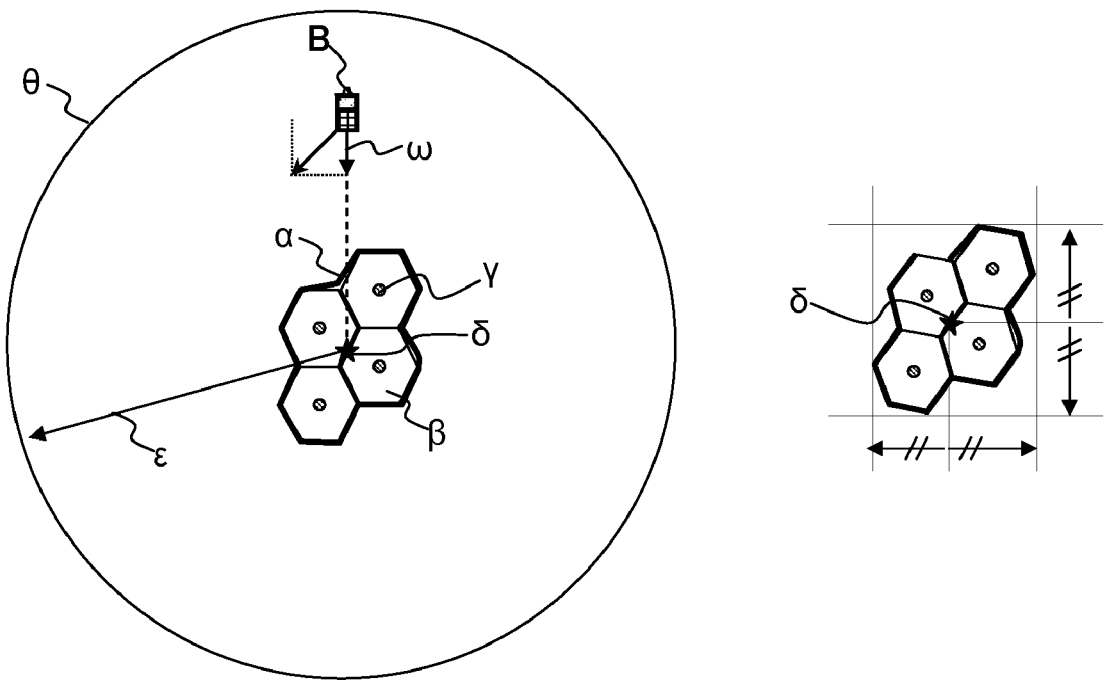
FIG. 2 presents the near zone according to the invention

This objective is achieved with a circular "near zone" perimeter $\theta$ around the zone $\alpha$ as outlined in FIG. 2. The zone $\alpha$ is defined by one or more cells $\beta$ each having a cell geographic centre coordinate $\gamma$. When the zone comprises more then one cell the zone has a zone geographic centre coordinate $\delta$. The zone geographic centre coordinate is the middle of the maximum and minimum latitude and longitude of the cell boundaries. The near zone perimeter is defined by the zone geographic centre coordinate and the perimeter radius $\epsilon$.

The relation between the called party current location when not in his zone and the near zone perimeter around his zone is the basis for the call completion options presented to the calling party. The information is additionally enhanced by the tangential movement $\omega$ of the called party in relation to the zone geographic centre.

When the called party has more than one zone, the zone closest to, distance between current location of called party and the zone geographic centre coordinate, is taken. The selection of the zone can be made more advanced by taking also the movement into consideration. The distance and tangential movement give the Estimate Time of Arrival (ETA) or when the movement is away from the zone Estimate Time to Return (ETR). The smallest ETA/ETR determines the nearest zone. ETA/ETR can only be used when the tangential movement is substantial greater then 0 for each zone.

The features of the invention are described by means of a series of embodiments. It shall be appreciated that numerous other uses can be made of the current invention without departing from the basic idea of the invention.

Figure 3:
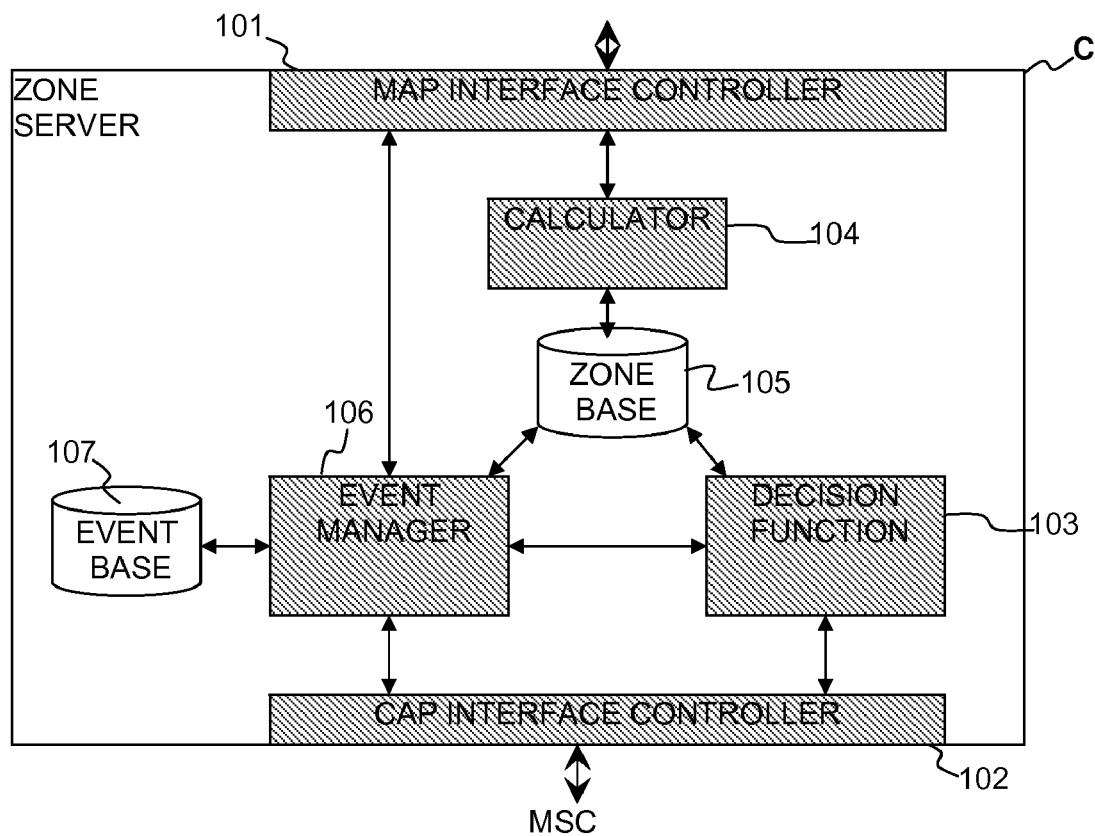
FIG. 3 presents the embodiment in a zone server

An embodiment of the current invention in a zone server is shown in FIG. 3. As outlined in the introduction implementation may be as zone server application running on the SCP, or a dedicated zone server node, or a combination of those. The following description is based on a dedicated zone server node implementation. It may be appreciated that the functions can be ported easily to a mixed or pure software implementation.

The zone server has three basic asynchronous functions; it keeps actively track of the location of mobile stations having zones and served by the zone server, it acts on calls towards the mobile station and it handles scheduled events for calling parties in relation to attempted connection to the mobile stations.

The zone server C comprises following functions;

A MAP (Mobile Application Part) interface controller 101 for handling the MAP interfaces to other nodes in the communication network like the HLR.

A CAP (CAMEL Application Part) controller 102 for handling the CAP interfaces to other nodes in the communication network like the MSC.

A calculator 104 handling location retrieval of mobile stations having defined zones and handled by the zone server. The calculator also performs the distance calculations as well as movement calculations. The calculation results are stored in the zone base 105. When required for calculations the calculator also fetches prior calculation results from the zone base. The calculator function runs independently of the event manager 106 and the decision function 103.

A zone base 105 holding records for each mobile station identity/zone combination handled by the zone server. The records contain the distance of the mobile station to each of his defined zones as well as the movement relative to the geographical centre of the defined zone. Also the current presence in; zone, near zone perimeter, HPLMN or VPLMN is stored in the zone base.

A decision function 103 that acts when a mobile station having zone and served by the zone server is called. The initiation is done by the MSC sending a CAP-IDP via the CAP interface. The decision function gives a connect order when it reads from the zone base 105 that the mobile station is present in one of its zones. The order is given by means of a CAP-CON message via the CAP interface towards the MSC. If not present in either of its zones the decision function orders the playing of a dedicated announcement to the calling party giving options for call completion relevant for the current position and movement of the called mobile station in relation to its zones. The decision function receives the calling party option selection and executes that option. This can include call termination, connection to voice mail, connect with reversed charging. It may prior to call termination also schedule a future event towards the event manager 106.

An event manager 106 that receives events to be scheduled from the decision function 103. The event manager stores the events in the event base 107. The event manager continuously checks if the conditions for stored events are met. It therefore reads the relevant information from the zone base. If a condition is met the action in the event is executed. This can be set up a call between the previous calling party and the mobile station or a notification to the calling party by means of a voice message, SMS or the like. The event manager has both the MAP and CAP interface available for executing the action in the event.

An event base 107 that holds for each event a record with details on the calling party, the mobile station, a condition to be met and an action to be taken.

Each of the mentioned functions will be described in more detail in the following sections.

MAP & CAP Interface Controller

The interface controllers for CAMEL and Mobile Application Part (CAP/MAP) are state of the art implementation according the 3GPP Technical specifications 29.002 and 29.078. Depending on the actual network and implementation of the zone server, MAP and CAP interfaces can be extended with ISUP (ISDN user part) ITU-T recommendation Q. 763 and 764 and INAP (Intelligent network application protocol) according to ETSI standards, for connection to other nodes.

Calculator

The calculator comprises 3 base functions; a requester, a report FIFO and a position calculator.

The requester sends position requests to the HLR for each MSISDN contained in the zone base. This allows adding new zones in the zone base which will automatically be taken into account by the requester. As given in the introduction a request can be either an ATI or an ALR request. The ATI request generates a position report as available in the HLR. The ALR request causes the HLR to interrogate the MSC for an actual position report. Next to this difference the requester can do one time requests or subscribe. However, ALR subscriptions provide a high load to the system. To reduce load, more intelligent methods are available like described in PCT application WO 2007/051482. It should be noted that some adaptations must be made due to the nature of the near zone perimeter which does not follow HPLMN boundaries. It is therefore required to treat neighbouring VPLMNs as the HPLMN and the LAC level can be omitted in the method. As long as the current location of the mobile is outside the HPLMN or one of the neighbouring VPLMNs, ATI subscription is sufficient as no distance calculation will be performed. The HLR will automatically send an update when the HLR receives an update from a MSC due to change of MCC, MNC or LAC. In case of an ALR subscription a report interval needs to be specified. Load reduction is also here possible by adjusting the subscription where related to the report interval based on the distance to a zone and the tangential movement value towards the zone geographical centre.

Position reports received from the HLR are temporarily stored in a FIFO before they are processed by the position calculator. Instead of a straightforward FIFO a more intelligent FIFO can be used that checks if older reports for the same MSISDN are still in the FIFO. If this is the case the older report is removed. The FIFO size can so be tuned to the number of served MSISDNs and overflow risk is mitigated.

The position calculator retrieves a position report from the FIFO and reads from the zone-cell table 204 all records having the same MSISDN as mentioned in the position report. The processing of a position report takes place in 3 stages that are executed for each defined zone belonging to the MSISDN. The retrieved records are therefore grouped in sets based on the zone number.

In the first stage the position calculator compares MCC, MNC and GCI/SAI as mentioned in the position report with the corresponding values in a first set of the records retrieved for the MSISDN i.e. the first zone. If MCC, MNC and GCI/

SAI match, then presence is set to "ZONE" in the zone table 200 record having the same MSISDN and Zone Number. When only MCC and MNC match, but not GCI, the value is set to HPLMN. When MCC and MNC do not match a separate check is performed if MCC and MNC as mentioned in the position report match alternative MCC-MNC combinations that are neighbouring the HPLMN or (partly) cover the same area of the HPLMN. The position calculator sets the value to CPLMN (covering PLMN) when matching, or when not, to VPLMN. Determination of CPLMN can be made more precise by taking LAC into account as well. This stage is completed by copying the time stamp retrieved from the position report into the timestamp field of the record.

In the second stage the distance and movement in relation to the zone's GCC (Geographical Centre Coordinate) is determined. The calculator therefore reads from the zone-distance table 202 records that have a matching MSISDN and zone number. For each MSISDN and zone number a fixed number of zone distance records have been entered at the time of defining the MSISDN zone combination to hold consecutive measurements. The oldest measurement record will be overwritten with the new measurement from the position report so the number of records is kept constant to a system defined number. The distance calculation is only performed when presence as determined before is HPLMN or CPLMN. If presence is VPLMN or zone then the distance value is set to −1 for VPLMN and 0 for zone. Second check is the presence of a LAT/LONG (latitude-longitude) coordinate in the position report. When present the distance between this LAT/LONG coordinate and the zone geographical centre coordinate as present in the previously retrieved record from the zone table, is calculated. This calculation can include the well known corrections for ellipsoid earth profile and latitude corrections. When not present the centre coordinate of the GCI, as mentioned in the report, is taken as basis for the distance calculation. Calculated distance and timestamp are entered in the oldest record retrieved from the zone-distance table as mentioned above.

The movement calculation is done if presence is CPLM, HPLMN or zone. In case of VPLMN the movement value is left blank. Movement is calculated as the difference between the oldest distance and calculated distance divided with the time difference of the corresponding timestamps. If the oldest distance value is −1 the next one is taken that has a valid distance. If only one valid distance is present (return from abroad case) no movement is calculated and the movement value is left blank. Instead of the mentioned sliding linear method also more advanced higher order methods can be used that give more weight to the movement between the 2 latest distances.

In the third stage the presence in near zone is determined when the presence value is CPLMN or HPLMN. This can be done simple, based on a predefined distance from the zone geographical centre. If the calculated distance is less or equal, the mobile station is set to be near zone. A more dedicated method is to use an estimated time of arrival method when the station is moving towards its zone. A system parameter is defined that gives a maximum estimated arrival time. The actual estimated time of arrival is calculated from movement and distance. If this estimate time of arrival is shorter then the system parameter the mobile station presence is said to be near zone. The same can be applied when the mobile station is moving away from the zone. An estimate time to return can be used by simply making the movement positive and compare as done for moving towards. If the movement value is very small or 0 estimate time methods should not be used and comparing to the predefined distance parameter should be done instead. If the presence near zone is detected then the presence value in the record from the zone table having the same MSISDN and zone number, is overwritten with a near zone value.

When more than one zone is defined for the MSISDN then a next set of records with same zone number is taken and handled as described before. This continues till the position report has been processed for all zones for the MSISDN mentioned in the report.

Although write back to the zone base is stated at each calculation best is to save actually write back to the zone base until all calculations for the position report are done. This guarantees that changes are made consistent and event manager or decision function do not read partly updated data from the zone base.

Zone Base

The zone base is the central information storage in the zone server. It allows the event manager and the decision function to work asynchronous from the calculations. This has a specific advantage as the decision function has not to wait for connecting due to a late position reports, requested from the HLR/MSC. The zone base 105 has 3 dedicated tables;

- A zone-cell table 204 holding the actual zone definitions for a MSISDN. Each record 205 holds a MSISDN, a zone number and a cell reference. The cell reference comprises MCC, MNC and GCI/SAI. If a zone comprises multiple cells several records exist having the same MSISDN and zone number. If for a MSISDN more then one zone is defined multiple records exist having the same MSISDN but different zone number.
- A zone distance table 202 holding distance records 203 per MSISDN zone number. As described before at zone definition a system parameter number of records are prepared to hold a number of consecutive distance measurements for the purpose of movement calculation. The distance is given as an integer number of meters. 0 is used to indicate presence at the zone rather then having a distance and −1 is used to indicate that no distance is calculated as the mobile station is not in the HPLMN or CPLMN.
- A zone table 200 holding a zone record 201 for each MSISDN zone number combination. The record contains the Geographical Centre Coordinate (GCC), the current presence, a timestamp and a movement indicator. The GCC is entered with the definition of a zone. The current presence indicator has one of the values for VPLMN, CPLMN, HPLMN, near zone or zone. The time stamp is retrieved from the last position report that has been processed. The movement indicator is a signed integer expressing the tangential movement in relation to the GCC in meters per second.

As described before access to the zone base is best arranged on basis of unitary transactions, assuring that updates are performed unitary.

Decision Function

As described in the introduction, an incoming call for the mobile subscriber having a zone causes the MSC to send a CAP-IDP message to the Zone server. The CAP-IDP message triggers the decision function. The decision function retrieves the called party presence information from the zone table where the MSISDN matches the called party's MSISDN. If the called party is in one of his zones the call is connected. The decision function therefore sends a CAP-CON message to the MSC.

Optionally also an announcement with or without selectable call completion options is played to the calling party when present in one of its zones, comparable to what is described below for the not present case.

If the called party is not in one of his zones then the decision function performs a second check. The second check comprises the allow ability of advanced presence notification for the calling party. See for details the further embodiment. When allowed the decision function uses the presence information to assemble an announcement to be played to the calling party, giving the calling party information on presence and movement, and requesting to select a form of completion of the call.

The calling party has 4 basic options to select from when the called party is not in one of his zones;

Connect to voice mail,

Connect to mobile with additional charges,

Call back when present,

Notification when present.

The calling party has of course the fifth option to just disconnect.

In either of the first 2 options the decision functions sends a CAP-CON message to the MSC. As an option a charging announcement can be played to the calling party when the "Connect to mobile with additional charges" option is selected. In some jurisdictions this announcement may be mandatory. In the later 2 options the calling party is notified of the selected option by an announcement. The decision function therefore sends a CAP-PA to the MSC. After playing this announcement the MSC returns a CAP-SRR. The decision function terminates the connection with sending CAP-Disconnect. The decision function prepares a future event record and passes it to the event manager.

In case of notification is selected by the calling party, the decision functions checks whether SMS notification can be used. The decision is based on the presence of a location number or information for the calling party in the CAP-IDP message. The announcement played to the calling party comprises 2 parts. The first part provides the advanced presence information, the second part the available options for completing the call. Both parts are subject to movement and presence information of the called party. Below table 1 shows the relation for the first part and table 2 for the second part.

TABLE 1 advanced presence information

| Zone Table | | |
|---|---|---|
| .Presence | .Movement | Example presence announcement |
| VPLMN | | "The number you called is currently abroad" |
| CPLMN | | "The number you called is currently abroad" |
| HPLMN | | "The number you called is currently not at home" |
| Near Zone | >0 | "The number you called is approaching home" |
| Near Zone | <0 | "The number you called is departing home" |
| Near Zone | =0/Blank | "The number you called is near home" |

TABLE 2 call completion options

| Zone Table | | Voice Mail | Connect & Charge | Call back when | Notify When |
|---|---|---|---|---|---|
| .Presence | .Movement | | | | |
| VPLMN | | Yes | Yes | In HPLMN Or @Home | In HPLMN Or @Home |
| CPLMN | | Yes | Yes | Near home Or @Home | Near home Or @Home |
| HPLMN | | Yes | Yes | Near home Or @Home | Near home Or @Home |
| Near Zone | >0 | Yes | Yes | @Home | @Home |
| Near Zone | <0 | Yes | Yes | @Home | @Home |
| Near Zone | =0/Blank | Yes | Yes | @Home | @Home |

The triggering events for the notifications in table 2 are based on movement towards the home zone. This is the most common anticipated usage. Additional triggers can be based on movement away from the home zone. Examples are leaving the HPLMN when inside the HPLMN or leaving the near zone when in the near zone perimeter. This will give the calling party more options to choose from. In practise however the number of options should be limited to 4-6 without becoming annoying. If more options are available a 2 stage inquiry is better; the first stage selecting one from the 4 main options and the second for the event when required.

The announcements can be made more useful to the calling party by including the calling party's own position in relation to the called party position. Therefore the decision function obtains a position report from either HLR of the calling party or MPS. Which HLR to contact is present in the CAP-IDP. This feature is of particular interest for calling parties that are currently inside the zone of the called party. It leaves the calling party the option to visit rather than to make a call.

Event Base

The event base 107 holds a record 206 for each future event coming from a option selection by the calling party causing termination of the call set-up and scheduling a future event based on conditions related to the movement of the called party. The record holds 4 basic elements; the identity of the calling party, the identity of the called party, the condition specification, and the action to take when the condition is met. The action part is build up with 2 elements; the action code and a data field. The action code specifies the type of action and the data field the location of the additional information required for the action. Example; the action code is "notify calling party by SMS"; the data field contains the location where the specific text for the SMS can be found.

Event Manager

The event manager 106 reads event record after event record from the event base 107. It queries the zone base and checks if the condition in the event is fulfilled. If so the action stated in the event is executed. After execution the event record is removed from the event base. This process can be interrupted by the decision function when the calling party selects a future event type of call completion. The decision function passes the contents of the event record to the event manager. The event manager stores the contents in a new event record in the event base.

The actions to be executed can comprise voice message notification, SMS notification or setting up a call. Other types of action are also possible. The event manager only executes an action. It does not check the validity of the action like; you can not send an SMS to a fixed phone. This is a task of the decision function.

Another task for the event manager is to check on obsolete future events. First option is to enter an additional time stamp for an event in the event table. The event manager can then remove the event without executing it when a certain time has passed since entering the event record. Good example is removal of call back event records having a time-stamp older then 24 hours. Second option is to remove event records when the actual movement is opposite of what is expected for the event. Example is to remove the event record for call back, entered when the called party presence was near zone, requesting call back when @ home, and the actual presence changes to VPLMN.

A further embodiment deals with the privacy aspect for the subscriber. The subscriber has the option to switch advanced presence notifications on or off. The subscriber is offered a web based client for fixed setting advanced position notification and the possibility to enable or disable advanced position notification via his mobile phone B. In addition the subscriber can enter via the web based client a list of telephone numbers (both fixed and mobile) that is treated differently from all other numbers that are not on the list. This allows the subscriber to have a family and friends group that is treated differently.

Figures 5, 6A, 6B:
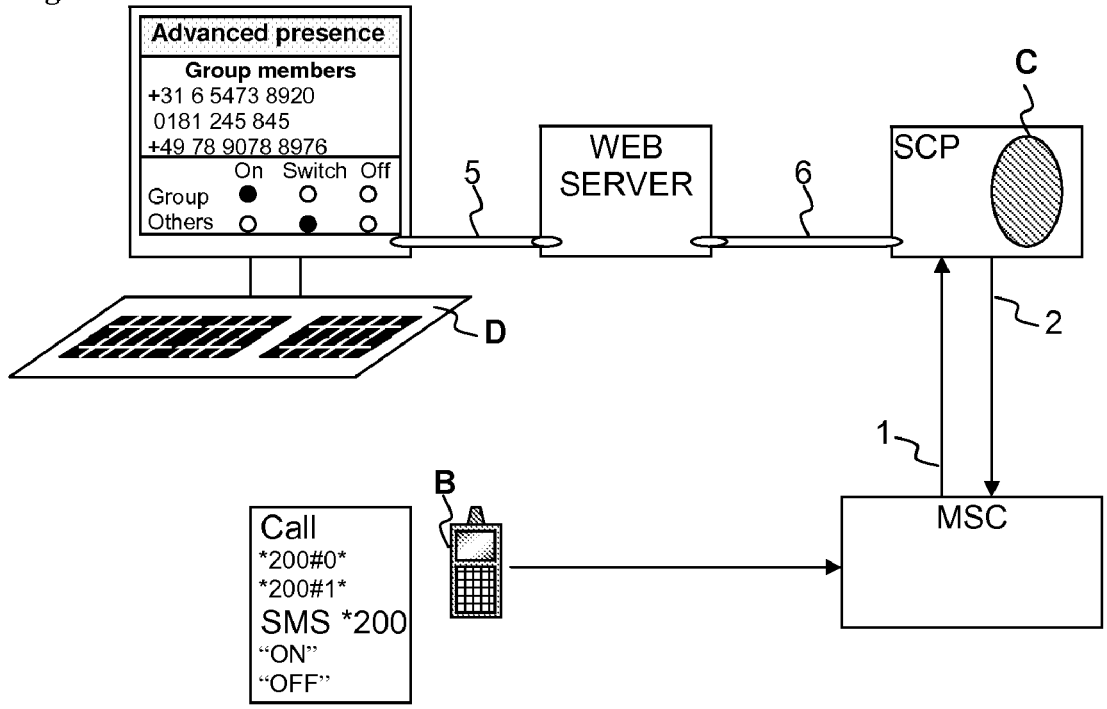
FIG. 5 presents a further embodiment of near zone according to the invention FIG. 6*a* & *b* present the table and record extensions required for the further embodiment.

The embodiment is described in FIG. 5. The user can via his Personal Computer D select a web page on the web server. The web server sets-up a first secure IP channel 5 and provides a log-in page. On the other side the web server has a continuous secure IP channel 6 to the zone base 105 in the zone server application C. This implies that a zone server or a zone server application host has an IP interface.

After entering MSISDN and password, and validation at the web server, the web server provides a client web application allowing the subscriber to access and alter his data in the zone base 105. The web server sends therefore a query to the zone base including the MSISDN and retrieves the relevant information. This information is then sent via the secure channel 5 to the web client. The user can make alterations and submit back to the web server, which in turn sends an update query to the zone base. The web client performs a first check on allow ability of the subscriber's alterations by means of syntax and semantic checks. The web server performs also a check on allow ability of the subscriber's alterations before sending the update query to the zone base. Finally the zone base has some rules that prohibit not allowed or inconsistent updating of records For this embodiment following adaptations are made to the zone server. First the zone base holds 2 additional tables shown in FIGS. 6a and 6b. The first one is a zone-group table 210 holding records 211 for MSISDN—group member number combinations. For each group member of a MSISDN a record exists. The second one is a zone-allowance table 208 holding one record 209 per MSISDN in which a status is stored. In total there are 3; a GROUP status, an OTHER status, and a SWITCH status. GROUP status and OTHER status can have 3 values; ON meaning that advanced position notification is enabled, OFF meaning that it is disabled and SWITCH meaning that it is controlled by the SWITCH status. SWITCH status is only ON or OFF. The subscriber can control GROUP and OTHER status via the web interface; SWITCH is controlled via the mobile phone B. It shall be noted that OTHER can not have a higher status then GROUP; GROUP OFF and OTHER ON is therefore not an allowed combination.

The second modification is to the decision function 103. Instead of the fixed mode of operation in the first embodiment the decision function has now 3 operating modes. Mode 1 is identical to the prior art type of operation. No advanced position notifications are performed. Mode 2 is identical to that as described in the first embodiment. Mode 3 comprises an extra check whether the calling party is a group member. If so mode 2 is applied, if not mode 1.

When the CAP-IDP from the MSC is received by the zone server the decision function, the decision function fetches a record from the zone-allowance table where the MSISDN equals the called party number in the CAP-IDP. Based on the status for GROUP, OTHER and SWITCH a mode is selected according to the table below.

TABLE 3

| Group status | Other status | Switch status | Decision mode |
|---|---|---|---|
| ON | ON | X | 2 |
| ON | Switch | ON | 2 |
| ON | Switch | Off | 3 |
| ON | Off | X | 3 |
| Switch | ON | X | # |
| Switch | Switch | ON | 2 |
| Switch | Switch | Off | 1 |
| Switch | Off | ON | 3 |
| Switch | Off | Off | 1 |
| Off | ON | X | # |
| Off | Switch | X | # |
| Off | Off | X | 1 |

X = don't care
this combination is not allowed

In case of mode 1 or 2 the CAP-IDP is directly handled in either mode. In case of Mode 3 the decision function fetches from the zone-group table all records where MSISDN matches the called party number in the CAP-IDP. The group member numbers in these records form together a group member list. If the calling party number as contained in the CAP-IDP is in the group member list then the CAP-IDP is further handled in mode 2, else it is handled in mode 1.

The third modification to the zone server relates to the control via the mobile phone B. As given before, the subscriber can use the mobile phone to set the SWITCH status to ON or OFF. The subscriber has in this 2 basic methods; that of a service call or that of a service SMS. An example of the service call is *300#0* for switching off and *300#1* for switching ON. An example of the service SMS is 'ON' or 'OFF' send to *300.

The methods and system for getting service calls to service applications in the SCP is well known in the state of the art. Service calls will end-up in a CAP-IDP send to the SCP. The code 300 indicates the zone server application. Here the decision function has to handle the CAP-IDP.

The method and system for transferring a service SMS directly from the MSC to the SCP is less well known. The transfer is initiated with a CAP-IDP but it requires cooperation of both CAP and MAP interface between MSC and SCP to get the contents to the zone server application. Again the 300 code identifies the zone server application where the decision function has to handle the CAP-IDP. Direct MSC-SCP SMS transfer is state of the art.

The decision function receiving a CAP-IDP needs therefore first to check which of the 3 cases it relates to; calling party to called party mobile, service call or service SMS. First check is therefore the called party number in the CAP-IDP. If this is a regular MSISDN then the CAP-IDP can be handled as described before. If the called party number contains *300 compliant to the stated examples above it is either a service call or service SMS. The presence of #0 or #1 after *300 in the called party field of the CAP-IDP indicates that it is a service call. The absence indicates a service SMS.

In case of a service call the 0 or 1 value in the called party field is used to update the SWITCH status. Therefore the decision function retrieves a record from the zone-allowance table where the MSISDN matches the calling party number in the CAP-IDP. The SWITCH value is updated and the record written back to the zone-allowance table. Finally CAP-Disconnect is send back to the MSC to end the operation.

In absence of 0 or 1, the content of the SMS is obtained from the MSC. As for the service call a record is retrieved and the status value is updated with the ON or OFF value stated in the SMS content. The record is written back and the operation is ended with a CAP-Disconnect.

Erroneous input with a service call or SMS needs to be handled. Acting on erroneous input with service calls is well known in the state of the art. The handling of erroneous input for SMS requires some additional elaboration. If the decision function finds that the content of the SMS is neither ON or OFF as given in the example, it requires notification of the sending subscriber that the value is incorrect. This can be done as part of a SMS dialogue between subscriber and service. The methods for SMS dialogue between a subscriber and a service application are also known in the art.

A further aspect of this embodiment is parental control. Parents one side do not want that their children switch the presence notification off for them and on the other side might want to limit presence notification to every body. The first can be achieved by adding a special group of numbers that always receive the notifications. These numbers are entered together with entering the subscription details in the zone base. A second option is that the control on the allowance is changed from the subscriber's mobile number to another mobile number (of the parents) disabling control of the subscriber's phone on allowance settings. The latter requires storing an IMSI/MSISDN additionally in the zone base and the decision function to use matching of calling MSISDN with that number rather then the subscription MSISDN in the zone base. There where no parental control is required the subscription MSISDN can be copied into this field to allow the subscription mobile to change allowance setting. When the decision function detects that multiple records exists in the zone base, as may occur when having more children, first the decision function shall inquire for which number allowance should be changed.

The embodiments describe the present invention for the purpose of enabling a person skilled in the art to appreciate the teachings rather than giving all possible implementations a person skilled in the art could make on basis of the teachings.

The invention claimed is:

1. A method for completing a call from a calling party to a mobile subscriber, where the mobile subscriber is assigned a defined zone (a) in a Public Land Mobile Network (PLMN) and where the mobile subscriber is not present in the defined zone, the method comprising the steps of:

using a zone server, determining the presence of the mobile subscriber's terminal inside a geographic area surrounding the defined zone ($\alpha$) wherein the defined zone ($\alpha$) includes a plurality of cells ($\beta$), and wherein the geographic area is defined by a circular perimeter ($\theta$) larger than the defined zone ($\alpha$) and a radius ($\epsilon$) measured from a zone geographical centre coordinate ($\delta$) of the zone ($\alpha$), wherein the zone geographical centre coordinate ($\delta$) is the middle of the maximum and minimum latitudes and maximum and minimum longitudes of the boundaries of the plurality of cells ($\beta$), and wherein the circular geographic area having radius ($\epsilon$) does not follow the boundary of the PLMN;

generating an announcement comprising a current location of the mobile subscriber in relation to the defined zone and comprising options for the calling party to complete the call;

triggering a Mobile service Switching Centre (MSC) to play the announcement to the calling party;

triggering the MSC to return a selection made by the calling party from the options to complete the call; and analyzing and executing the selection made by the calling party.

2. The method as claimed in claim 1, for a mobile subscriber having more than one defined zone, comprising the additional step of determining a closest zone of the more than one zones.

3. The method as claimed in claim 2, further detailing the closest zone as a zone having the shortest distance between a current location of the mobile subscriber and a zone geographical centre coordinate ($\delta$) from the more than one zones.

4. The method as claimed in claim 2, further detailing the closest zone as a zone having the shortest Estimated Time of Arrival or Estimated Time to Return, based on distance between a current location of the mobile subscriber and a zone geographical centre coordinate and a tangential movement ($\omega$) towards the zone geographical centre coordinate ($\delta$) from the more than one zones.

5. The method as claimed in claim 1, further detailing the step of generating an announcement by the steps of:

retrieving the current position of the calling party;

checking the presence of the calling party inside the defined zone or perimeter of the mobile subscriber; and generating an announcement comprising a current location of the mobile subscriber in relation to the defined zone and comprising options for the calling party to complete the call, said announcement specially adapted to the presence of the calling party inside the defined zone or perimeter of the mobile subscriber.

6. The method as claimed in claim 1, further detailing possible options as connecting to a voice mail, connecting with bearing additional charges, notification or call back.

7. The method as claimed in claim 1, further detailing a radius ($\epsilon$) as a fixed distance, or a variable distance determined by a tangential movement ($\omega$) of the mobile subscriber towards a zone geographical centre coordinate ($\delta$) and a fixed period of time, said variable distance being subject to a minimum and a maximum value.

8. The method as claimed in claim 1 comprising the additional step of checking allowance of the mobile subscriber for the calling party to receive a current location of the mobile subscriber, by the zone server.

9. The method as claimed in claim 8, further detailing the step of checking allowance by the steps:

checking if the calling party is a member of a defined group;

checking, in case the calling party is a member of a defined group, on a current allowance setting for that group; and checking, in case the calling party is not a member of a defined group, on a current allowance setting for non-group members.

10. The method according to claim 8, further comprising, determining a current allowance setting wherein the mobile subscriber, is in a telecommunication system comprising at least one Mobile Terminal, connected to a Mobile service Switching Centre (MSC), connected to a Zone Server or Zone Server Application running on a Service Control Point (SCP), comprising the step of sending an Short Message Service (SMS) message, USDD message, or IN call from the Mobile Terminal to the Zone Server or Zone Server Application, by the mobile subscriber.

11. The method according to claim 8, further comprising determining a current allowance setting by the mobile subscriber, in a telecommunication system comprising a client computer node operationally connected to a web-server containing zone control web pages, connected to a Zone Server or Zone Server Application running on a Service Control Point (SCP), the step of determining the current allowance setting comprising the steps of:
  logging on to the web-server from the client computer node, by the mobile subscriber,
  requesting a zone control web page from the web-server; changing the current allowance setting:
  returning the zone control web page to the web-server;
  sending an order message for change of the current allowance setting to the Zone Server or Zone Server Application, by the web-server; and
  receiving the order message and changing the current allowance setting according to the order message by the Zone Server or Zone Server Application.

12. The method, according to claim 9, further comprising determining the members of an allowance group, by the mobile subscriber, in a telecom system comprising a client computer node connected to a web-server containing zone control web pages, connected to a Zone Server or Zone Server Application running on a Service Control Point (SCP), the step of determining the members comprising the steps of,
  logging on to the web-server from the client computer node, by the mobile subscriber;
  requesting a zone control web page from the web-server; changing memberships in the group membership;
  returning the zone control web page to the web-server;
  sending an order message for change of the memberships to the Zone Server or Zone Server Application, by the web-server; and
  receiving the order message and changing the group membership according to the order message by the Zone Server or Zone Server Application.

13. A Zone Server having Mobile Application Part (MAP) interfaces towards Home Location Registers via a MAP interface controller and Camel Application Part (CAP) interfaces towards Mobile service Switching Centres via a CAP interface controller for receiving position reports of mobile subscribers having at least one defined zone and incoming call triggers for the mobile subscribers, wherein, the Zone Server further comprises:
  a calculator connected to a first database for determining, based on the received position reports, a closest zone of the at least one defined zone of a mobile subscriber and presence of the mobile subscriber outside the closest zone and inside a circular perimeter surrounding the closest zone, wherein the closest zone includes a plurality of cells and wherein the perimeter is larger than the closest zone and has a radius measured from a center coordinate of the closest zone, wherein the center coordinate is a middle of the maximum and minimum latitudes and maximum and minimum longitudes of the boundaries of the plurality of cells, and wherein the circular perimeter does not follow the boundary of a Public Land Mobile Network (PLMN) associated with the closest zone;
  the first database for storing the at least one defined zone and presence information of mobile subscribers, and allowance for calling parties to receive presence information; and
  decision function connected to the first database for determining whether a calling party is to receive presence information, for generating an announcement for the calling party including options for completing a call and for analyzing and executing a selected option from the calling party, based on the received incoming call triggers.

14. The Zone Server according to claim 13 further comprising:
  an event manager connected to the decision function;
  a second database for receiving future event triggers from the decision function, for analyzing the future event triggers, for storing a future event to be executed, for scanning the second database for future events to be executed, and for executing these future events.

15. The zone server according to claim 13, wherein the decision function is specially configured for:
  receiving Intelligent Network (IN) service calls via the CAP interface from mobile subscribers;
  determining the allowance for calling parties based on the received IN service calls; and
  storing this allowance in the first database.

16. The zone server according to claim 13, wherein the decision function has an Internet Protocol connection for receiving allowance order messages from mobile subscribers, and is specially configured to update allowance for calling parties to receive presence information stored in the first database based on the allowance order messages.

* * * * *

UNITED STATES PATENT AND TRADEMARK OFFICE
CERTIFICATE OF CORRECTION

| | |
|---|---|
| PATENT NO. | : 8,346,240 B2 |
| APPLICATION NO. | : 12/678247 |
| DATED | : January 1, 2013 |
| INVENTOR(S) | : Morales Barbosa |

It is certified that error appears in the above-identified patent and that said Letters Patent is hereby corrected as shown below:

In the Specifications

In Column 1, Line 23, delete "differently then" and insert -- differently than --, therefor.

In Column 2, Line 24, delete "The may" and insert -- They may --, therefor.

In Column 2, Line 60, delete "29.078" and insert -- 29.078. --, therefor.

In Column 3, Line 3, delete "more then" and insert -- more than --, therefor.

In Column 3, Line 18, delete "larger then" and insert -- larger than --, therefor.

In Column 3, Line 30, delete "more then" and insert -- more than --, therefor.

In Column 4, Line 28, delete "system" and insert -- system. --, therefor.

In Column 4, Line 29, delete "invention" and insert -- invention. --, therefor.

In Column 4, Line 30, delete "server" and insert -- server. --, therefor.

In Column 4, Line 31, delete "FIG. 4a-4d" and insert -- FIGS. 4a-4d --, therefor.

In Column 4, Line 32, delete "server" and insert -- server. --, therefor.

In Column 4, Line 34, delete "invention" and insert -- invention. --, therefor.

In Column 4, Line 35, delete "FIG. 6a & b" and insert -- FIGS. 6a & b --, therefor.

In Column 4, Lines 48-49, delete "more then" and insert -- more than --, therefor.

In Column 5, Line 2, delete "greater then" and insert -- greater than --, therefor.

In Column 7, Line 60, delete "shorter then" and insert -- shorter than --, therefor.

In Column 8, Lines 29-30, delete "more then" and insert -- more than --, therefor.

Signed and Sealed this
Twenty-first Day of May, 2013

Teresa Stanek Rea
*Acting Director of the United States Patent and Trademark Office*

CERTIFICATE OF CORRECTION (continued)
U.S. Pat. No. 8,346,240 B2

In Column 8, Line 38, delete "rather then" and insert -- rather than --, therefor.

In Column 11, Lines 6-7, delete "older then" and insert -- older than --, therefor.

In Column 11, Line 45, delete "records" and insert -- records. --, therefor.

In Column 11, Line 61, delete "status then" and insert -- status than --, therefor.

In Column 12, Line 2, delete "3comprises" and insert -- 3 comprises --, therefor.

In Column 13, Line 36, delete "rather then" and insert -- rather than --, therefor.

In Column 13, Line 37, delete "There where" and insert -- Where --, therefor.

In the Claims

In Column 13, Line 52, in Claim 1, delete "(a)" and insert -- ($\alpha$) --, therefor.

In Column 13, Line 57, in Claim 1, delete "($\alpha$)" and insert -- ($\alpha$), --, therefor.

In Column 14, Line 48, in Claim 8, delete "claim 1" and insert -- claim 1, --, therefor.

In Column 15, Line 13, in Claim 11, delete "subscriber," and insert -- subscriber; --, therefor.

In Column 15, Line 15, in Claim 11, delete "setting:" and insert -- setting; --, therefor.

In Column 15, Line 30, in Claim 12, delete "of," and insert -- of: --, therefor.

In Column 16, Line 7, in Claim 13, delete "cells and wherein the perimeter" and insert -- cells, and wherein the circular perimeter --, therefor.

In Column 16, Line 23, in Claim 13, delete "a call" and insert -- a call, --, therefor.